(12) United States Patent
Ishida et al.

(10) Patent No.: US 11,111,817 B2
(45) Date of Patent: Sep. 7, 2021

(54) COOLING DEVICE FOR CASING SUPPORT PART OF ROTARY MACHINE, ROTARY MACHINE, AND COOLING METHOD FOR CASING SUPPORT PART OF ROTARY MACHINE

(71) Applicant: Mitsubishi Hitachi Power Systems, Ltd., Yokohama (JP)

(72) Inventors: Tomohiro Ishida, Tokyo (JP); Tomoyuki Onishi, Tokyo (JP); Makoto Kondo, Tokyo (JP); Takumi Matsumura, Tokyo (JP); Katsuhisa Hamada, Yokohama (JP)

(73) Assignee: MITSUBISHI POWER, LTD., Yokohama (JP)

( * ) Notice: Subject to any disclaimer, the term of this patent is extended or adjusted under 35 U.S.C. 154(b) by 190 days.

(21) Appl. No.: 16/086,754

(22) PCT Filed: Nov. 15, 2016

(86) PCT No.: PCT/JP2016/083772
§ 371 (c)(1),
(2) Date: Sep. 20, 2018

(87) PCT Pub. No.: WO2017/163482
PCT Pub. Date: Sep. 28, 2017

(65) Prior Publication Data
US 2019/0048741 A1    Feb. 14, 2019

(30) Foreign Application Priority Data

Mar. 25, 2016 (JP) .............................. JP2016-061918

(51) Int. Cl.
*F01D 25/12*    (2006.01)
*F01D 25/24*    (2006.01)
(Continued)

(52) U.S. Cl.
CPC ............ *F01D 25/125* (2013.01); *F01D 25/08* (2013.01); *F01D 25/12* (2013.01); *F01D 25/14* (2013.01);
(Continued)

(58) Field of Classification Search
CPC ........ F01D 25/125; F01D 25/12; F01D 25/08; F01D 25/16; F01D 25/24
(Continued)

(56) References Cited

U.S. PATENT DOCUMENTS 9,695,705 B2 *  7/2017  Zheng .................... F01D 25/14
2009/0053035 A1  2/2009  Zhang et al.
(Continued)

FOREIGN PATENT DOCUMENTS

DE    102013108851 A1    2/2014
JP    2006-105050 A      4/2006
(Continued)

OTHER PUBLICATIONS

International Search Report dated Feb. 7, 2017, issued in counterpart application No. PCT/JP2016/083772. (2 pages).
(Continued)

*Primary Examiner* — Kayla McCaffrey
(74) *Attorney, Agent, or Firm* — Westerman, Hattori, Daniels & Adrian, LLP (57) ABSTRACT

In a rotary machine that includes rotating body including a rotating-body main body and a pair of rotor shaft ends fixed to the both outer sides in the shaft direction of the rotating-body main body; a casing accommodating the rotating-body main body and being penetrated by the rotor shaft ends; a bearing rotatably supporting the rotor shaft ends and having a bearing face being provided with lubricant fluid from a lubricant line; and the support part supporting the casing, the
(Continued)

support part is cooled through heat exchanging between the lubricant fluid the support part.

17 Claims, 5 Drawing Sheets

(51) Int. Cl.
    *F01D 25/28*     (2006.01)
    *F02C 7/20*     (2006.01)
    *F02C 7/00*     (2006.01)
    *F01D 25/08*     (2006.01)
    *F01D 25/14*     (2006.01)
    *F02C 7/06*     (2006.01)

(52) U.S. Cl.
    CPC ............ *F01D 25/24* (2013.01); *F01D 25/28* (2013.01); *F02C 7/00* (2013.01); *F02C 7/06* (2013.01); *F02C 7/20* (2013.01); *F05D 2220/30* (2013.01); *F05D 2240/50* (2013.01); *F05D 2260/20* (2013.01); *F05D 2260/98* (2013.01)

(58) Field of Classification Search
    USPC .......................................................... 415/112
    See application file for complete search history.

(56) References Cited

U.S. PATENT DOCUMENTS

| | | | |
|---|---|---|---|
| 2012/0195750 A1* | 8/2012 | Navjot | .................... F01D 25/28 |
| | | | 415/213.1 |
| 2014/0053394 A1* | 2/2014 | Cooper | .................. F01D 25/16 |
| | | | 29/726 |

FOREIGN PATENT DOCUMENTS

| | | |
|---|---|---|
| JP | 2007-009731 A | 1/2007 |
| JP | 2009-052547 A | 3/2009 |
| JP | 4347269 B2 | 10/2009 |
| JP | 4410651 B2 | 2/2010 |
| JP | 2011-33002 A | 2/2011 |
| JP | 2012-159051 A | 8/2012 |
| JP | 5159702 B2 | 3/2013 |
| JP | 2014-43857 A | 3/2014 |
| JP | 2015-175246 A | 10/2015 |

OTHER PUBLICATIONS

International Preliminary Report on Patentability (Form PCT/IB/373) issued in counterpart International Application No. PCT/JP2016/083772 dated Sep. 25, 2018 with Translation of Written Opinion (Form PCT/ISA237). (7 pages).

Office Action dated Jan. 8, 2020, issued in counterpart KR application No. 10-2018-7026960, with English translation. (10 pages).

Office Action dated Mar. 13, 2020, issued in counterpart KR application No. 10-2018-7026960, with English translation. (6 pages).

Office Action dated Jul. 2, 2020, issued in counterpart IN Application No. 201817034264, with English translation. (6 pages).

* cited by examiner

COOLING DEVICE FOR CASING SUPPORT PART OF ROTARY MACHINE, ROTARY MACHINE, AND COOLING METHOD FOR CASING SUPPORT PART OF ROTARY MACHINE

TECHNICAL FIELD

The present invention relates to a cooling device for a casing support part of a rotary machine, a rotary machine using the same, and a cooling method for a casing support part of a rotary machine.

BACKGROUND TECHNIQUE

In some steam turbine or gas turbine known to the public, the turbine casing is provided with protruding units called curved-leg bases and is supported via the curved-leg bases. Specifically, the turbine casing is supported by vertically arranging support bases on the ground and further placing curved legs on the support bases.

During the operation of the turbine, the curved legs and the support bases become high temperature to thermally elongate. The thermal elongation of the curved legs and the support bases in the thickness direction (i.e., in the upward vertical direction) displaces the overall turbine casing in the upward vertical direction. In addition, since three-dimensional temperature distribution is formed on the curved legs and the support bases, the curved-leg bases undergo thermal deformation into upwardly convex shapes or tapering-off shapes and this deformation also displaces the overall turbine casing in the upward vertical direction.

In contrast, the temperature distribution of the rotor during the operation of the turbine is symmetric with respect to the rotor rotating shaft. For the above, even when the rotor thermally elongates, the height of the rotor rotating shaft does not displace very much.

Consequently, during the operation of the turbine, the turbine casing moves upward relative to the rotor. Accordingly, the gap between the turbine casing and the rotor widens at the upper portion and narrows at the lower portion.

If the thermal deformation of the turbine casing is large, the turbine casing is brought into contact with the rotor at the lower portion to generate vibration. If the thermal deformation of the turbine casing is excessively large, the turbine casing is brought into hard contact with the rotor, resulting in possible damage of the turbine casing and the rotor that hinders the operation of the turbine.

Patent Literature 1 discloses a technique to suppress the displacement of a turbine casing in the upward vertical direction due to such thermal elongation. Hereinafter, description will now be made in relation to a technique disclosed in Patent Literature 1, enclosing reference numbers used in Patent Literature 1 in brackets for the reference.

In the technique disclosed in Patent Literature 1 (for example, see paragraphs [0044]-[0045], FIG. 4), a path (13) is formed in columns (6) corresponding to the support bases, and the columns (6) is cooled by circulating cooling fluid such as air or water through the path (13). Thereby, the thermal elongation (thermal expansion) of the columns (6) is suppressed and displacement in the vertical upper direction of the turbine casing (1) is also suppressed.

PRIOR ART REFERENCE

Patent Literature

[Patent Literature 1] Japanese Patent No. 4347269

SUMMARY OF INVENTION

Problems to be Solved by Invention

Unfortunately, the technique disclosed in Patent Literature 1 additionally requires a cooling fluid to be provided to the columns (6) and a facility to provide the cooling fluid, and therefore has a problem of increasing a running cost and a facility cost.

One of the objects of the present invention is to provide a cooling device for a casing support part of a rotary machine that can suppress increase of a running cost and a facility cost and also suppress thermal elongation and thermal deformation of the support part by cooling the support part, a rotary machine using the cooling machine, and a cooling method for casing support part of a rotary machine.

Means to Solve the Problem (1) To attain the above object, the cooling device for a casing support part of the present invention that cools a support part of a rotary machine, which includes: a rotating body including a rotating-body main body and a pair of rotor shaft ends fixed to the both outer sides in the shaft direction of the rotating-body main body; a casing accommodating the rotating-body main body and being penetrated by the rotor shaft ends; a bearing rotatably supporting the rotor shaft ends and having a bearing face being provided with lubricant fluid from a lubricant line; and the support part supporting the casing, the cooling device being characterized by a heat exchanger being disposed on the lubricant line and cooling the support part through heat exchanging between the lubricant fluid the support part.

(2) Preferably, the support part includes a protruding unit protruding from a main body of the casing, and a supporting base mounting the protruding unit thereon, and a heat insulating layer is provided to an outer surface of the main body of the casing and an outer surface of the protruding unit.

(3) Preferably, the support part includes a protruding unit protruding from a main body of the casing, and a supporting base mounting the protruding unit thereon, and the heat exchanger is incorporated in the supporting base.

(4) Preferably, the support part includes a protruding unit protruding from a main body of the casing, and a supporting base mounting the protruding unit thereon, the heat exchanger comprises a plurality of branch pipes arranged in parallel with one another in a protruding direction of the protruding unit, and the plurality of branch pipes are regulated so as to let a larger amount of the lubricant fluid flow therethrough as being disposed closer to the main body of the casing.

(5) Preferably, the lubricant line includes a bypass line through which the lubricant fluid is provided to the bearing face, bypassing the heat exchanger; the cooling device further includes distribution regulating means that regulates a distribution of a flow volume of the lubricant fluid that is to bypass the heat exchanger and a flow volume of the lubricant fluid that is to be provided to the heat exchanger; temperature detecting means that detects temperature of the support part; and a control device that controls operation of the distribution regulating means such that the flow volume of the lubricant fluid that is to be provided to the heat exchanger increases as the temperature detected by the temperature detecting means is higher.

(6) To attain the above object, the rotary machine of the present invention is characterized by including a cooling device for a casing support part defined in one of the above (1) to (5).

(7) To attain the above object, the cooling method for a casing support part that cools a support part of a rotary machine, which includes: a rotating body including a rotating-body main body and a pair of rotor shaft ends fixed to the outer sides in the shaft direction of the rotating-body main body; a casing accommodating the rotating-body main body and being penetrated by the rotor shaft ends; a bearing rotatably supporting the rotor shaft ends and having a bearing face being provided with lubricant fluid from a lubricant line; and the support part supporting the casing, the cooling method being characterized by including cooling the support part through heat exchanging between the lubricant fluid the support part.

Effect of Invention

According to the present invention, since the support part can be cooled by using a lubricant oil supplied to the bearing face, which eliminates the requirement for preparing a dedicated cooling medium to cool the support part and the most of the requirement for providing an additional facility to cool the support part.

Accordingly, thermal elongation and thermal deformation of the support part can be suppressed concurrently with suppressing increase in a running cost and a facility cost.

EMBODIMENTS TO CARRY OUT INVENTION

Hereinafter, description will now be made in relation to the embodiments of the present invention by referring to the accompanying drawings.

The following embodiments are merely exemplary, and have no intention to exclude various modifications and applications of techniques not explicitly described therein. The respective structures of the following embodiments can be variously modified without departing from the scope of the invention, and may be selected, omitted, combined according to the requirement.

The following description assumes that the present invention to is applied by a turbine a turbine.

1. First Embodiment 1-1. Entire Configuration of a Turbine

Hereinafter, description will now be made in relation to the entire configuration of a turbine according to the present embodiment with reference to FIG. 1.

Figure 1:
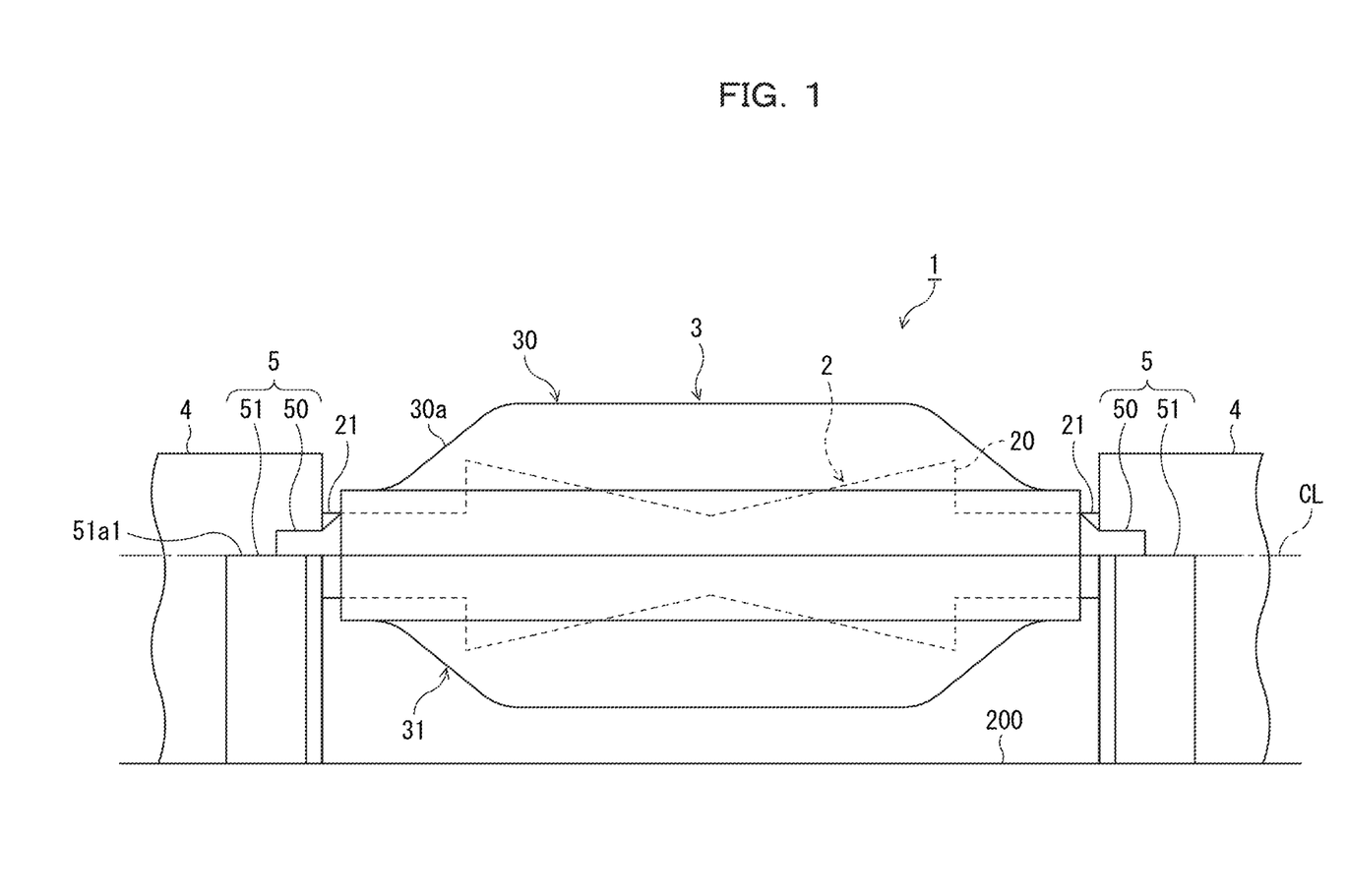
FIG. 1 is a schematic side view illustrating the entire configuration of a turbine according to the embodiments of the present invention.

FIG. 1 is a schematic side view illustrating the entire configuration of a turbine.

A turbine (rotary machine) 1 includes a rotor (rotating body) 2, a turbine casing (casing) 3 that accommodates the rotor 2, bearing boxes (bearing unit) 4 that rotatably support the rotor 2, and turbine casing support parts 5 (hereinafter also referred to as "support parts") that support the turbine casing 3 on a ground 200.

The rotor 2 is accommodated in the turbine casing 3 in such a posture that the rotation centerline CL thereof (hereinafter also referred to as "rotation center line CL of the rotor") is arranged horizontally. The rotor 2 is formed by arranging a rotor main body (rotating-body main body) 20 and a pair of rotor shaft ends (rotating shaft ends) 21 provided on the both outer sides in the shaft direction of the rotor main body 20 on the rotation center line CL of the rotor and integrating the rotor main body 20 and the rotor shaft ends 21.

The rotor main body 20 is accommodated in the turbine casing 3. Each rotor shaft end 21 penetrates through the turbine casing 3, and the tip of each rotor shaft end 21 is exposed outside the turbine casing 3 and is supported by the bearing box 4.

The rotor main body 20 is driven and provided with rotating force by hydraulic fluid (e.g., overheated steam or combustion gas) flowing inside the turbine casing 3, and drives an electric power generator or a compressor (both not appearing in drawings) coupled to the rotor main body 20 via the rotor shaft ends 21 using the rotating force.

The turbine casing 3 is horizontally halved into an upper turbine casing 30 and a lower turbine casing 31. The rotor shaft ends 21 are drawn from the turbine casing 3 to the outside on the mating face between the upper turbine casing 30 and the lower turbine casing 31.

Each support part 5 includes a protruding unit 50 that protrudes from a point close to one of the four corners of the main body of the upper turbine casing 30 or the main body of the lower turbine casing 31, in particular, the main body (hereinafter also referred to "upper turbine casing main body") 30a of the upper turbine casing 30 in the present embodiment, in the shaft direction of the rotor shaft end 21, and a supporting base 51 in the form of a box shape vertically arranged on the ground 200. The turbine casing 3 is supported by the ground 200 via the support parts 5 by placing the protruding units 50 on respective upper faces (ceiling outer faces) 51a1 of the supporting bases 51. Each protruding unit 50 is called "curved-leg base" for its shape, and hereinafter is also referred to as curved-leg base 50.

1-2. Cooling Device for Turbine Casing Support Part

Further description will now be made in relation to the bearing boxes 4 and the supporting bases 51 and also to the cooling device 100 for a turbine casing support part with reference to FIG. 2.

Figure 2:
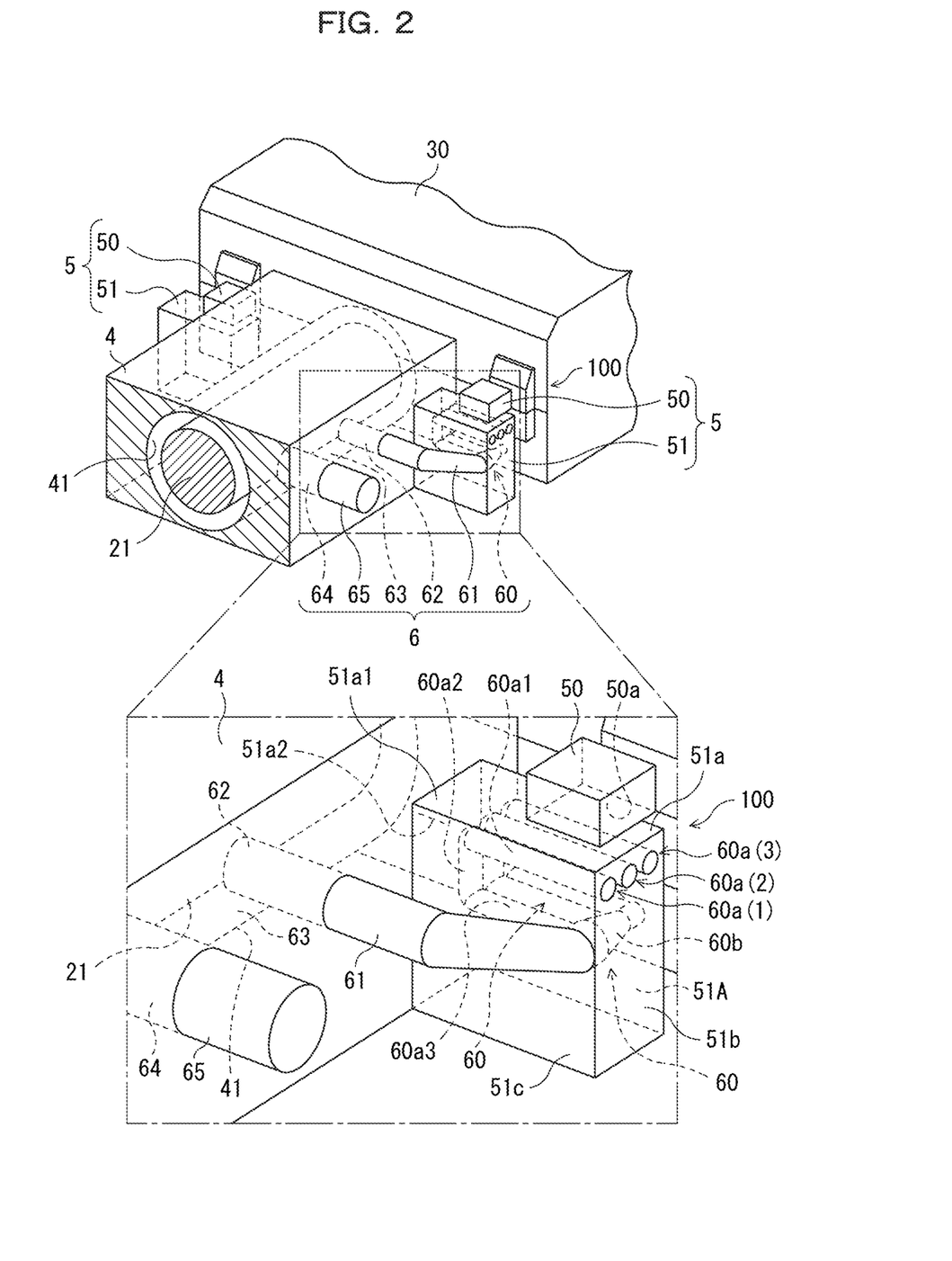
FIG. 2 is a schematic isometric view illustrating the configuration of the cooling device of a turbine casing support part according to a first embodiment along with an enlargement view of the principal part thereof.

FIG. 2 is a schematic isometric view illustrating the configuration of the cooling device 100 of a turbine casing support part according the first embodiment along with an enlargement view of the principal part thereof.

To the bearing surface (a sliding surface with which the rotor shaft end 21 comes into slidably contact) 41 that supports a rotor shaft end 21 in each bearing box 4, a lubricant line 6 (omitted in FIG. 1) successively provides low-temperature (about the outside-air temperature) lubricant oil (lubricant fluid). The supporting base 51 takes a form of a hollow box shape having a hollow portion 51A, and the lubricant line 6 is provided through the hollow portion 51A to the bearing surface 41.

Each lubricant line 6 is formed of a heat exchanger 60 incorporated in the supporting base 51, a filler pipe 61, a filler opening 62 drilled in the bearing box 4, a minute clearance 63 between the rotor shaft end 21 and the bearing surface 41, a scavenger opening 64 drilled in the bearing box 4, and a scavenger pipe 65, which are arranged in this sequence from the upstream side and are coupled to one after another. To the heat exchanger 60, the lubricant oil is provided from a lubricant oil providing apparatus (not illustrated) consisting of, for example, a tank, a pump, and pipes.

The lubricant oil is of low temperature. Incorporating the heat exchanger 60 in the supporting base 51 (passing the lubricant line 6 through the supporting base 51) makes the lubricant oil flowing through the heat exchanger 60 cool the curved-leg base 50 and the supporting base 51. This means that the cooling device 100 of the present embodiment is formed by incorporating the heat exchanger 60, which is a part of the lubricant line 6, in the bearing box 4.

For the convenience, FIG. 2 enlarges the clearance 63 and omits the lubricant line 6 and the cooling device 100 provided to the other supporting base 5 (sic, correctly 51) on the left side of the drawing.

The heat exchanger 60 includes multiple (in this embodiment, three) branch pipes 60a(1), 60a(2), and 60a(3), and a collecting header 60b formed by gathering the branch pipes 60a(1), 60a(2), and 60a(3).

Hereinafter, when the branch pipes 60a (1), 60a (2), and 60a(3) are not discriminated from one another, the branch pipes 60a(1), 60a(2), and 60a(3) are referred to as branch pipes 60a.

The multiple branch pipes 60a are arranged horizontally. Each branch pipe 60a includes a horizontal pipe 60a1 having an end (on the right end in FIG. 2) being coupled to the lubricant oil providing apparatus on the front face 51b of the supporting base 51, a vertical pipe 60a2 having an upper end coupled to the other end (on the left end in FIG. 2) of the horizontal pipe 60a1, and a horizontal pipe 60a3 having one end (on the left end in FIG. 2) coupled to the lower end of the vertical pipe 60a2.

Each branch pipe 60a has a U-turn shape that returns in the hollow portion 51A of the supporting base 51.

The horizontal pipe 60a1 of each branch pipe 60a is arranged at a position close to the upper portion of the ceiling inner face 51a (sic, correctly 51a2) of the supporting base 51 so as to cover the substantially entire of the lower face 50a of the curved-leg base 50 opposed upward to the horizontal pipe 60a1 being interposed by the ceiling inner face 51a (sic, correctly 51a2). With this configuration, heat is transferred between the horizontal pipe 60a1 and the curved-leg base 50 via the ceiling inner face 51a (sic, correctly 51a2), so that the overall curved-leg base 50 is cooled from its lower face of 50a by the lubricant oil flowing through the horizontal pipe 60a1. The supporting base 51 is cooled by each branch pipe 60a via the hollow portion 51A or directly.

Forming each branch pipe 60a into a U-turn shape that returns in the hollow portion 51A of the supporting base 51 elongates the pipe length (flow path length) of the branch pipe 60a and thereby widens the heat exchanging area. This effectively cools the supporting base 51 to suppress the thermal elongation and also cools a wide range of the supporting base 51 such that the supporting base 51 has uniform temperature distribution and thereby can be inhibited from thermal deformation.

To the collecting header 60b, the other end (the right end in FIG. 2) of the horizontal pipe 60a3 of each branch pipe 60a is coupled. The lubricant oil provided from each branch pipe 60a to the collecting header 60b drains out from the supporting base 51 and flows into the filler pipe 61.

The other end (the left end in FIG. 2) of the filler pipe 61 is coupled to the inlet of the filler opening 62, which is drilled on the bearing box 4. The outlet of the filler opening 62 is coupled to the clearance 63 between the rotor shaft end 21 and the bearing surface 41. The clearance 63 is coupled to the inlet of the scavenger opening 64 drilled on the bearing box 4, and the outlet of the scavenger opening 64 is coupled to the scavenger pipe 65. With this configuration, the lubricant oil provided from the filler pipe 61 to the bearing surface 41 through the filler opening 62 is drained out from the scavenger opening 64 through the scavenger pipe 65.

1-3. Effects and Action

According to the first embodiment of the present invention, an incorporated part of the lubricant line 6 that provides and scavenges the lubricant oil to and from bearing surface 41, the incorporated part serving as the heat exchanger 60, in the supporting base 51 can cool the support part 5 (the curved-leg base 50 and the supporting base 51) with the lubricant oil flowing through the heat exchanger 60.

Accordingly, thermal elongation of the support part 5 can be inhibited, and in particular, suppressing the thermal elongation in the thickness direction of the support part 5 can suppress the displacement of the turbine casing 3 in the upward vertical direction.

Furthermore, since the lubricant oil is also used as a cooling medium, the requirement for preparing a dedicated cooling medium to cool the supporting bases 51 and the curved-leg bases 50 can be eliminated and also the requirement for providing an additional facility to cool the support parts 5 can be almost eliminated.

Accordingly, the supporting bases 51 and the curved-leg base 50 are cooled and can be avoided from thermal elongation and thermal deformation, and concurrently the running cost and the facility cost can be avoided from increasing.

Since the lubricant oil is provided from the upper portion close to the curved-leg bases 50, which are heated to higher temperature than the supporting bases 51, to the heat exchanger 60, the curved-leg bases 50 can be efficiently cooled by the lubricant oil being in a state of having the lowest temperature.

1-4. Modification (1) First Modification

As described in "Background Technique", each curved-leg base 50 undergoes possible thermal deformation that its tip becomes thinner (hereinafter, also referred to as "tapering-off thermal deformation"). The tapering-off thermal deformation is caused by generation of a thermal gradient that comes to be higher temperature as approaching the root of the curved-leg base 50, which means that a thermal gradient that comes to be higher as a part of positioning upper right in FIG. 2 so as to approach the upper turbine casing main body 30a (in other words, the temperature becomes lower as approaching the tip).

Considering the above, more lubricant oil flows through a branch pipe 60a close to the root of the curved-leg base 50. In other words, the flow volume F(1) of the branch pipe 60a(1), the flow volume F(2) of the branch pipe 60a (2), and the flow volume F(3) of the branch pipe 60a(3) may be set to be larger in this sequence (i.e., flow volume F(1)<flow volume F(2)<flow volume F(3)).

The specific manner of setting these flow volumes is not particularly limited. As one example, the flow volumes may be set by setting the size of the pipes such that the inner diameters of the branch pipes comes to be larger in the sequence of the branch pipes 60a(1), 60a(2), and 60a(3) (i.e., the inner diameter of the branch pipe 60a(1)<the inner diameter of the branch pipe 60a(2)<the inner diameter of the branch pipe 60a(3)). Alternatively, the flow volumes may be regulated by disposing orifices in the respective branch pipes 60a(1), 60a(2), and 60a(3) or by disposing regulating valve that regulate the respective flow volumes.

As the above, each curved-leg base 50 can be efficiently cooled with flow volumes appropriately for the temperature by letting a relatively larger amount of the lubricant oil being the cooling medium at the higher-temperature side (root side) and letting a relatively smaller amount of the lubricant oil being the cooling medium at the lower-temperature side (tip side). Consequently, the curved-leg base 50 can have uniform temperature free from distribution. This further effectively suppress thermal deformation of the curved-leg base 50.

(2) Second Modification

Description will now be made in relation to the present modification by referring to FIG. 3.

Figure 3:
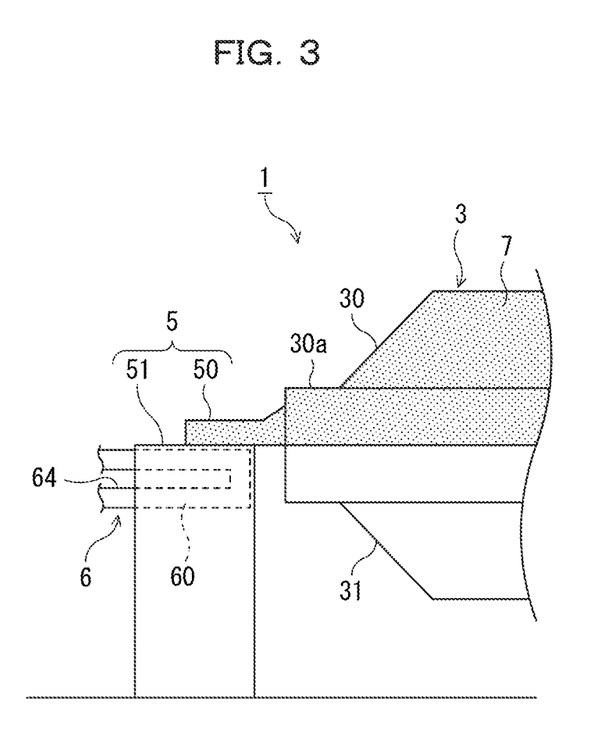
FIG. 3 is a schematic side view illustrating the configuration of the principal part according to a modification to the first embodiment of the present invention.

FIG. 3 is a schematic side view illustrating the configuration of the present modification (omitting the bearing box 4 and the rotor shaft ends 21).

As illustrated in FIG. 3, a heat insulating layer 7 having excellent heat resistance may be provided to the respective outer circumference faces of the upper turbine casing main body 30a and the curved-leg base 50 exposed to the outside, i.e., to the dotted portion in FIG. 3.

Since each curved-leg base 50 has a thermal gradient that comes to be lower temperature as approaching the tip as described above, providing the heat insulating layer 7 can abate the thermal gradient. In other words, the heat insulating layer 7 can flatten the thermal gradient from the root to the tip of the curved-leg base 50. This is because the thermal gradient is abated by the heat insulating layer 7 inhibiting the tip side of the curved-leg base 50, which easily dissipates heat because being distant from high-temperature upper turbine casing main body 30a, from dissipating heat and subsequent coming to be low temperature. This can inhibit the curved-leg bases 50 from tapering-off thermal deformation caused by the thermal gradient.

Cooling each support part 5 lowers the overall temperature to flatten the thermal distribution of the support part 5 and reduces an amount of thermal elongation of the support part 5, so that the difference of thermal elongation can be abated. This also suppress the thermal deformation, such as thermal deformation into upwardly convex shapes or tapering-off shapes, caused by the difference of thermal elongation.

Meanwhile, although providing the heat insulating layer 7 causes the entire curved-leg base 50 to have higher temperature to increase an amount of heat transferred from the curved-leg base 50 to the supporting base 51, the supporting base 51 is cooled by the heat exchanger 60 and therefore can be inhibited from undergoing thermal elongation and thermal deformation.

As the above, incorporating the heat exchanger 60 in the supporting base 51 and also providing the outer circumference faces of the upper turbine casing main body 30a and the curved-leg base 50 synergistically inhibit the curved-leg base 50 and the supporting base 51 from undergoing thermal elongation and thermal deformation.

2. Second Embodiment 2.1 Configuration

Figure 4:
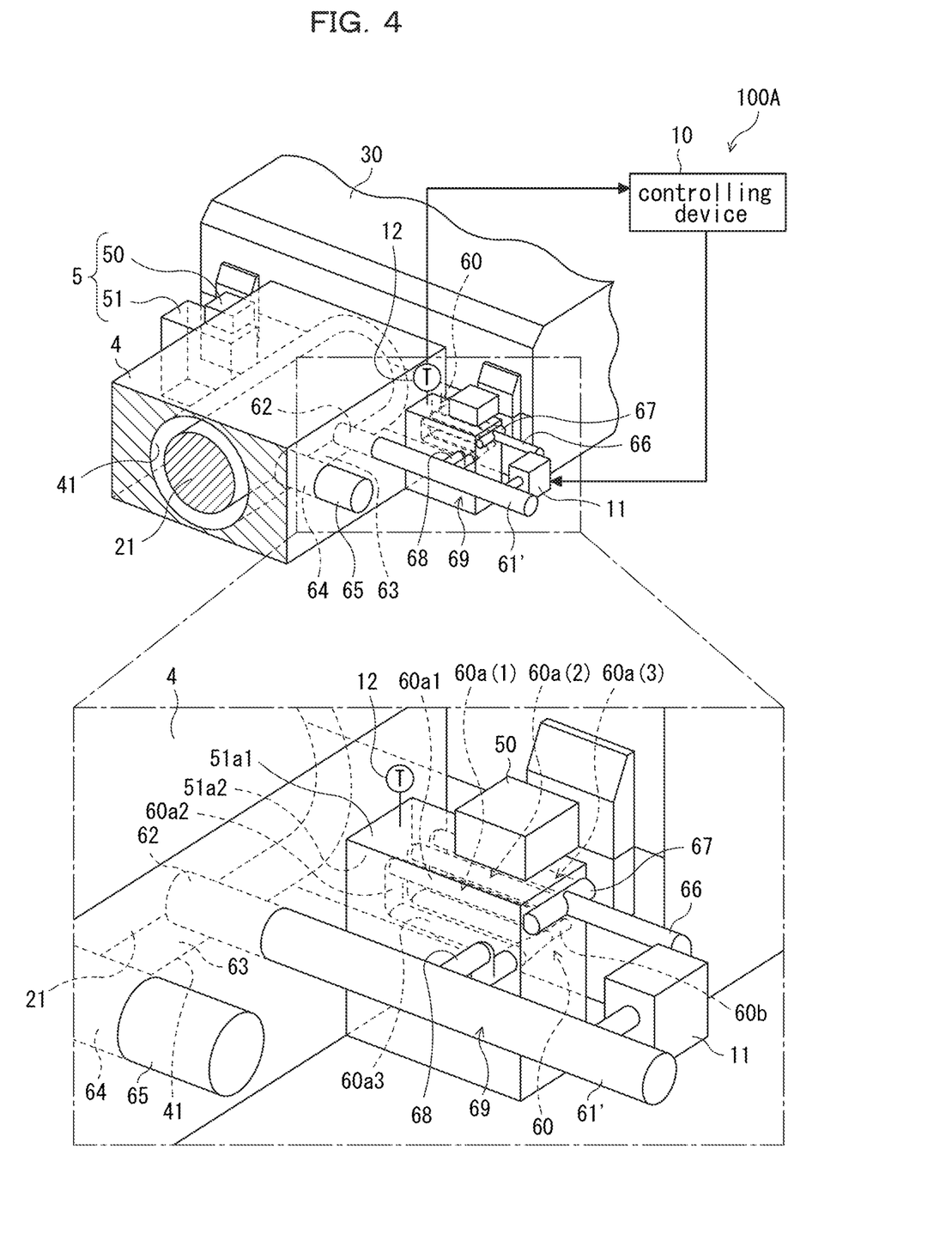
FIG. 4 is a schematic isometric view illustrating the configuration of the cooling device of a turbine casing support part according to a second embodiment along with an enlargement view of the principal part thereof and the control block diagram.

Description will now be made in relation to a cooling device 100A of the present embodiment. Like reference numbers designate the same elements and parts between the first and second embodiments, so repetitious description is omitted here.

FIG. 4 is a schematic isometric view illustrating the configuration of the cooling device 100A of a turbine casing support part according to the second embodiment along with an enlargement view of the principal part thereof and a control block diagram. For the convenience, FIG. 4 enlarges the clearance 63 and omits the lubricant line 6 and the cooling device 100A provided to the other 5 on the left side of the drawing.

The cooling device 100A of the turbine casing support part of the present embodiment is different from the cooling device 100 (see FIG. 2) of the turbine casing support part of the first embodiment in the point that the cooling device 100A is configured to regulate an amount of the lubricant oil to be provided to each supporting base 51 (the heat exchanger 60).

Specifically, the lubricant oil providing apparatus (not illustrated) is coupled to the filler pipe 61', so that the lubricant oil providing apparatus provides the lubricant oil first to the filler pipe 61'. The branch pipe 66, which is branched from the filler pipe 61', is coupled to the distributing header 67 at the center of the extending direction of the distributing header 67.

The distributing header 67 extends in the direction (in this example, the horizontal direction) of arranging the branch pipes 60a(1), 60a(2), and 60a(3), and the inlets of the branch pipes 60a(1), 60a(2), and 60a(3) are coupled to the circumference face of the distributing header 67 in parallel with one another. The outlets of the branch pipes 60a(1), 60a(2), and 60a(3) are coupled to the circumference face of collecting header 60b. The outlet of the collecting header 60b is coupled to the inlet of the merging pipe 68, and the outlet of the merging pipe 68 is coupled to the filler pipe 61' at the downstream side (i.e., on the side of the bearing face 41) of the connection of the branch pipe 66 and the filler pipe 61'.

With this configuration, the lubricant oil provided to the filler pipe 61' flows into the branch pipe 66, and then divided into part to flow through, in sequence, the heat exchanger 60, the merging pipe 68, and the filler pipe 61' and then be provided to the bearing surface 41, and the remaining part to be provided to the bearing surface 41, not flowing into the branch pipe 66 but bypassing the heat exchanger 60. Namely, a part of the filler pipe 61' between the connection with the branch pipe 66 and the connection with the merging pipe 68 functions as a bypass flow path (bypass line 69 that bypasses the heat exchanger 60.

In the branch pipe 66, a flow regulating valve (distribution regulating means) 11 is interposed. Regulating the degree of the opening of the flow amount regulating valve 11 controls distribution ratio of an amount of lubricant oil to flow into the branch pipe 66 to be provided to the heat exchanger 60 to an amount of lubricant oil to flow into the bypass flow path 69 and bypass the heat exchanger 60.

In addition, a temperature sensor (temperature detecting means) 12 that detects the temperature (hereinafter referred to as "supporting base temperature") T1 of the supporting base 51 is provided and a controlling device 10 is provided which controls the operation of the flow regulating valve 11 such that, when that the supporting base temperature T1 detected by the temperature sensor 12 becomes higher, the degree of opening the flow regulating valve 11 is increased.

Specifically, the controlling device 10 compares the supporting base temperature T1 detected by the temperature sensor 12 and a reference temperature TH, and, when the supporting base temperature T1 is higher than the reference temperature TH, opens the degree of opening the flow regulating valve 11 by a predetermined opening to increase the amount of the lubricant oil to be provided to the heat exchanger 60, so that an amount of cooling the supporting base 51 is increased. In contrast to the above, when the supporting base temperature T1 is lower than a reference temperature TL, the controlling device 10 narrows the degree of opening the flow regulating valve 11 by a predetermined opening to reduce the amount of the lubricant oil to be provided to the heat exchanger 60, so that an amount of cooling the supporting base 51 is decreased. As a result, as the supporting base temperature T1 detected by the temperature sensor 12 increases, the number of controls made to increase the degree of opening of the flow regulating valve 11 until the supporting base temperature T1 coincides with the reference temperature TH increases, so that the degree of opening of the flow regulating valve 11 is largely controlled.

Alternatively, as the temperature difference (=T1−TH) obtained by subtracting the reference temperature TH from the supporting base temperature T1 increases, the amount of changing the degree of opening of the flow regulating valve 11 for each time may be set to be increased.

Here, the reference temperature TL is set to be lower than the reference temperature TH by ΔT (>0). This setting avoids hunting in the control.

The remaining configuration is the same as that of the first embodiment, so repetitious description is omitted here.

2-2. Action and Effect

Figure 5:
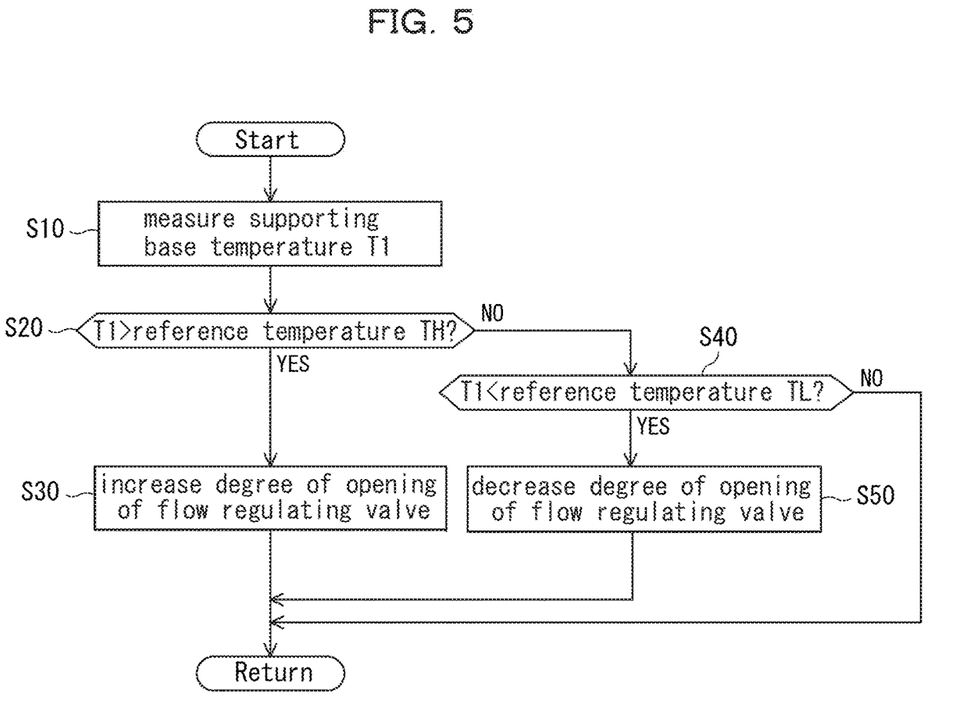
FIG. 5 is a flow diagram illustrating control performed in the second embodiment of the present invention.

In the present embodiment, control is carried out as shown in the flow chart of FIG. 5.

To begin with, the supporting base temperature T1 is detected by the temperature sensor 12 in step S10.

In the ensuing step S20, the supporting base temperature T1 is compared with the reference temperature TH. If the supporting base temperature T1 is higher than the reference temperature TH (T1>TH), the control proceeds to step S30 to increase the degree of opening of the flow regulating valve 11 by a predetermined opening. In contrast, if the supporting base temperature T1 is equal to or lower than the reference temperature TH (T1≤TH), the control proceeds to step S40.

In step S40, the supporting base temperature T1 is compared with the reference temperature TL. If the supporting base temperature T1 is lower than the reference temperature TL (T1<TL), the control proceeds to step S50 to decrease the degree of opening of the flow regulating valve 11 by a predetermined opening and is then returned. In contrast, if the supporting base temperature T1 is equal to or higher than the reference temperature TL (T1≥TL), the control is returned without changing the degree of opening of the flow regulating valve 11.

Consequently, since the present embodiment more increases the degree of opening of the flow regulating valve 11 as the supporting base temperature T1 is higher, and more reduces the degree of opening of the flow regulating valve 11 as the supporting base temperature T1 is lower, the amount of lubricant oil to be provided to the curved-leg base 50 and the supporting base 51 can be optimized so as to match the supporting base temperature T1.

2-3. Modification (1) Alternatively, the temperature (hereinafter, referred to as a "curved-leg base temperature") T2 of the curved-leg base 50 may be detected in place of the supporting base temperature T1, and, when the curved-leg base temperature T2 is higher than the reference temperature TH, the degree of opening of the flow regulating valve 11 may be increased while when the curved-leg base temperature T2 is lower than the reference temperature TL, the degree of opening of the flow regulating valve 11 may be decreased.

Otherwise, the temperature TF of the lubricant oil at the inlet or the outlet of the heat exchanger 60, and the degree of opening of the flow regulating valve 11 may be more increased as the difference ΔT(=T1−TF or T2−TF) between the supporting base temperature T1 (or the curved-leg temperature T2) and the lubricant oil temperature TF is larger.

(2) At least one of the first modification and the second modification described in [1-4. Modification] of the first embodiment may be applied to the second embodiment.

3. Miscellaneous (1) In the foregoing embodiments, the supporting base 51 is cooled by the heat exchanger 60 in which the lubricant oil flows and which is incorporated in the supporting base 51. However, the heat exchanger is not limited to this structure. Alternatively, the heat exchanger may be configured by bringing part of the pipe constituting the lubricant line into contact with a predetermined point (e.g., the root) of the curved-leg base 50. Otherwise, the heat exchanger may be configured so as to bringing part of the pipe constituting the lubricant line into contact with the outer face of the supporting base 51 by coiling the part of the pipe around the 51.

(2) In the foregoing embodiment, description is made in relation to a case where the present invention is applied to a turbine. However, the present invention is not limited to application to a turbine, and may alternatively applied to other rotary machines (e.g., a compressor).

DESCRIPTION OF REFERENCE SIGNS

1 turbine (rotary machine)
2 rotor (rotating body)
3 turbine casing (casing)
4 bearing box (bearing unit)
5 support part
6 lubricant line
7 heat insulating layer
10 controlling device
11 flow regulating valve (distribution regulating means)
12 temperature sensor (temperature detecting means)
20 rotor main body (rotating-body main body)
21 rotor shaft end 30 upper turbine casing
30a main body of the upper component 30
31 lower turbine casing
41 bearing surface
50 protruding unit (curved-leg base)
50a lower face of the protruding unit 50
51 supporting base
51A hollow portion of the supporting base 51
51a1 upper face of the supporting base 51 (ceiling outer face)
51a2 ceiling inner face
51b front face of the supporting base 51
51c side face of the supporting base 51
60 heat exchanger
60a, 60a(1), 60a(2), 60a(3) branch pipe of the heart exchanger 60
60a1, 60a2 horizontal pipe of the branch pipe 60a
60a2 vertical pipe
60a3 horizontal pipe
60b collecting header of the heat exchanger 60
61, 61' filler pipe
62 filler opening
63 clearance
64 scavenger opening
65 scavenger pipe
66 branch pipe
67 distributing header
68 merging pipe
59 bypass flow path (bypass line)
100, 100A cooling device
200 ground
CL rotation center line of the rotor 2

The invention claimed is:

1. A cooling device for a casing support part that cools a support part of a rotary machine that comprises: a rotating body including a rotating-body main body and a pair of rotor shaft ends fixed to both outer sides in a shaft direction of the rotating-body main body; a casing accommodating the rotating-body main body and being penetrated by the rotor shaft ends; a bearing rotatably supporting the rotor shaft ends and having a bearing face being provided with lubricant fluid from a lubricant line; and the support part supporting the casing, the cooling device comprising a heat exchanger being disposed on the lubricant line and cooling the support part through heat exchanging between the lubricant fluid and the support part, wherein
the support part comprises a protruding unit protruding from a main body of the casing, and a supporting base mounting the protruding unit thereon,
the heat exchanger is provided in the support part,
the heat exchanger comprises a plurality of branch pipes arranged in parallel with one another in a protruding direction of the protruding unit, and
the plurality of branch pipes are regulated so that the branch pipe closer to the main body of the casing is provided with more lubricating fluid.

2. The cooling device for a casing support part according to claim 1, wherein a heat insulating layer is provided to an outer surface of the main body of the casing and an outer surface of the protruding unit.

3. The cooling device for a casing support part according to claim 2, wherein the heat exchanger is incorporated in the supporting base.

4. The cooling device for a casing support part according to claim 3, wherein
the lubricant line comprises a bypass line through which the lubricant fluid is provided to the bearing face, bypassing the heat exchanger;
the cooling device further comprises:
a flow regulating valve that regulates a distribution of a flow volume of the lubricant fluid that is to bypass the heat exchanger and a flow volume of the lubricant fluid that is to be provided to the heat exchanger;
a temperature sensor that detects temperature of the support part; and
a controlling device that controls operation of the flow regulating valve distribution regulating means such that the flow volume of the lubricant fluid that is to be provided to the heat exchanger increases as the temperature sensor temperature detecting means is higher.

5. A rotary machine comprising a cooling device for a casing support part defined in claim 4.

6. A rotary machine comprising a cooling device for a casing support part defined in claim 3.

7. The cooling device for a casing support part according to claim 2, wherein
the lubricant line comprises a bypass line through which the lubricant fluid is provided to the bearing face, bypassing the heat exchanger;
the cooling device further comprises:
a flow regulating valve that regulates a distribution of a flow volume of the lubricant fluid that is to bypass the heat exchanger and a flow volume of the lubricant fluid that is to be provided to the heat exchanger;
a temperature sensor that detects temperature of the support part; and
a controlling device that controls operation of the flow regulating valve such that the flow volume of the lubricant fluid that is to be provided to the heat exchanger increases as the temperature detected by the temperature sensor is higher.

8. A rotary machine comprising a cooling device for a casing support part defined in claim 7.

9. A rotary machine comprising a cooling device for a casing support part defined in claim 2.

10. The cooling device for a casing support part according to claim 1, wherein the heat exchanger is incorporated in the supporting base.

11. The cooling device for a casing support part according to claim 10, wherein
the lubricant line comprises a bypass line through which the lubricant fluid is provided to the bearing face, bypassing the heat exchanger;
the cooling device further comprises:
a flow regulating valve that regulates a distribution of a flow volume of the lubricant fluid that is to bypass the heat exchanger and a flow volume of the lubricant fluid that is to be provided to the heat exchanger;
a temperature sensor that detects temperature of the support part; and
a controlling device that controls operation of flow regulating valve such that the flow volume of the lubricant fluid that is to be provided to the heat exchanger increases as the temperature detected by the temperature sensor is higher.

12. A rotary machine comprising a cooling device for a casing support part defined in claim 11.

13. A rotary machine comprising a cooling device for a casing support part defined in claim 10.

14. The cooling device for a casing support part according to claim 1, wherein the lubricant line comprises a bypass line through which the lubricant fluid is provided to the bearing face, bypassing the heat exchanger;

the cooling device further comprises:

a flow regulating valve that regulates a distribution of a flow volume of the lubricant fluid that is to bypass the heat exchanger and a flow volume of the lubricant fluid that is to be provided to the heat exchanger;

a temperature sensor that detects temperature of the support part; and a controlling device that controls operation of the flow regulating valve such that the flow volume of the lubricant fluid that is to be provided to the heat exchanger increases as the temperature detected by the temperature sensor is higher.

15. A rotary machine comprising a cooling device for a casing support part defined in claim 14.

16. A rotary machine comprising a cooling device for a casing support part defined in claim 1.

17. A cooling method for a casing support part that cools a support part of a rotary machine that comprises: a rotating body including a rotating-body main body and a pair of rotor shaft ends fixed to both outer sides in a the shaft direction of the rotating-body main body; a casing accommodating the rotating-body main body and being penetrated by the rotor shaft ends; a bearing rotatably supporting the rotor shaft ends and having a bearing face being provided with lubricant fluid from a lubricant line; and the support part supporting the casing and comprising a protruding unit protruding from a main body of the casing, and a supporting base mounting the protruding unit thereon, the cooling method comprising cooling the support part through heat exchanging between the lubricant fluid and the support part; and providing with more lubricating fluid a part closer to the main body of the casing by using a plurality of branch pipes in the support part, the plurality of branch pipes are arranged in parallel with each other in a protruding direction of the protruding unit and are provided in the heat exchanger and are regulated so that the branch pipe closer to the main body of the casing is supplied with more lubricating fluid.

* * * * *